Feb. 10, 1970  C. THOMSON  3,494,212
PULLEYS

Original Filed June 12, 1967  2 Sheets-Sheet 2

INVENTOR
CHARLES THOMSON
BY: Stevens, Davis, Miller & Mosher
ATTORNEYS 3,494,212
PULLEYS Charles Thomson, Wokingham, England, assignor to Solar Thompson Engineering Company Limited, Camberley, Surrey, England
Continuation of application Ser. No. 645,443, June 12, 1967. This application Apr. 15, 1969, Ser. No. 817,278
Claims priority, application Great Britain, Nov. 3, 1966, 49,424/66
Int. Cl. F16h 55/48
U.S. Cl. 74—230.7                     6 Claims

ABSTRACT OF THE DISCLOSURE

In a pulley having an outer peripheral groove for guiding a rope or cable, the groove is formed in annular members pressed together to form a ring of U-shaped cross-section by side cheeks which are readily removable to facilitate replacement of the pulley.

---

This application is a continuation of application Ser. No. 645,443, filed June 12, 1967, now abandoned.

This invention is concerned with pulleys of the kind which have a peripheral recess or groove for receiving a rope or cable.

In cable or rope systems (e.g. in such systems for supporting and frictionally driving conveyor belts), wear occurs on the cable or rope as a result of its passage round pulleys. The amount of wear increases with the work done by the system and in order to maintain the amount of wear within economic limits it is often necessary to impose an otherwise undesirably low limit on the work done by the system. In order to reduce the amount of wear on the rope or cable and thereby increase the economic working capacity of the system, it has been proposed to provide in the peripheral recess or groove of a pulley, a ring of rubber, or other elastomeric material for engagement by the rope or cable.

It is an object of the present invention to provide a pulley having an elastomeric ring in its peripheral recess or groove, which pulley is readily constructed and which is such that the elastomeric ring can be readily replaced.

According to the present invention, a pulley has side cheeks, at least one of which is removable, holding a plurality of annular members of rubber or other elastomeric material in compression against one another, the annular elastomeric members co-operating to form a ring with a peripheral recess or groove for receiving a rope or cable.

Preferably the side cheeks comprise two opposed annular cheek members removably mounted on a hub member. The cheek members may conveniently be bolted to the hub member.

In a preferred arrangement there are two of said annular elastomeric members, each being bonded to a cheek.

The cheeks are preferably formed to provide an annular trough of curved U-shaped cross-section containing the annular elastomeric members, which themselves co-operate to provide a ring of curved U-shaped cross-section.

Further features of the invention will be evident from the following description, which is given by way of example, of an embodiment thereof, with reference to the accompanying drawings, in which.

Figure 1:
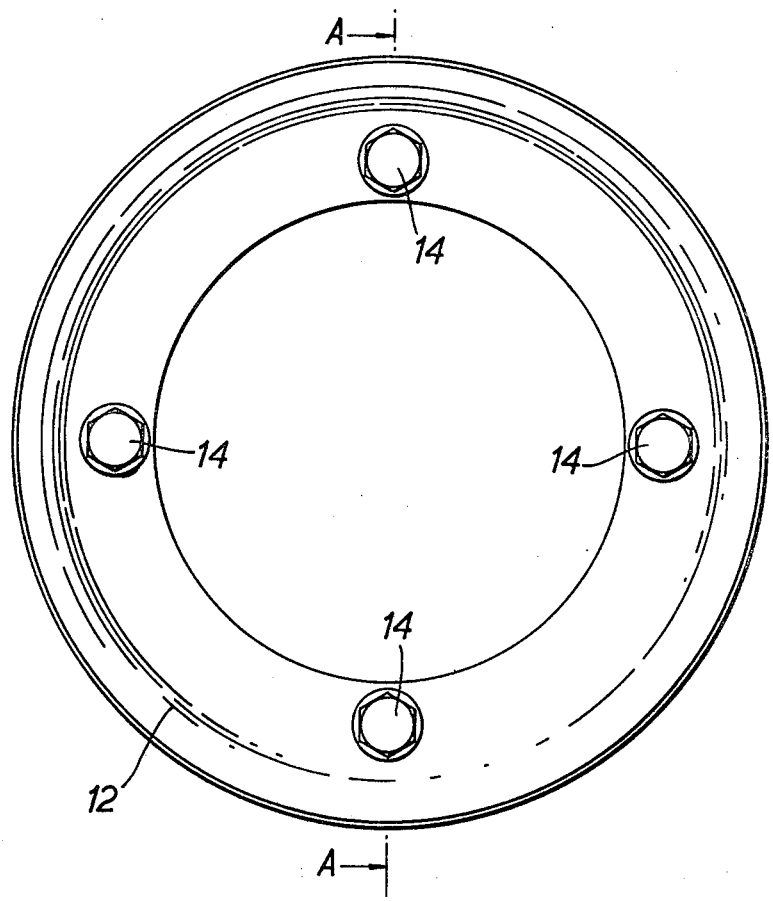
FIG. 1 is a side view of a pulley in accordance with the invention.
Figure 2:
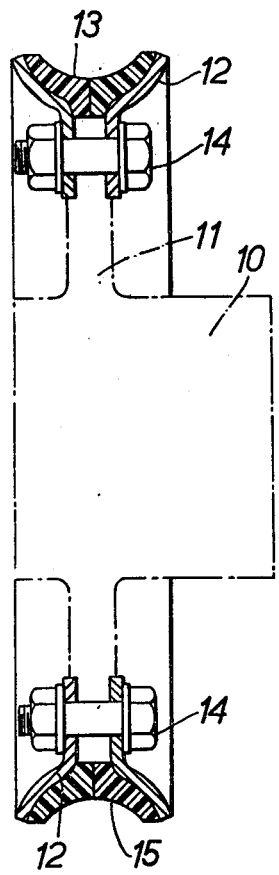
FIG. 2 is a section on the line A—A of FIG. 1.
Figure 3:
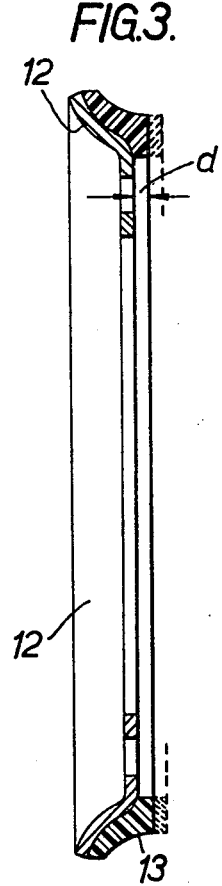
FIGS. 3 and 4 are sections of the two cheek members removed from the pulley.
Figure 4:

The pulley is mounted on a shaft 10 with an annular flange 11. The pulley has two annular cheek members or rims 12 in the form of steel pressings. Moulded on to each member 12 so as to be bonded thereto is an annular member 13 of polyurethane. The members 12 are bolted to the flange 11 by bolts 14 and are formed to define an annular trough of arcuate generally U-shaped cross-section, the base of the trough being provided by the periphery of the flange 11. The polyurethane members 13 co-operate to form a ring of arcuate generally U-shaped cross-section fitting against the whole inside surface of said annular trough and having an annular recess or groove 15 for receiving a rope or cable 16. The depth of the mould used in forming the members 13 is such that the interengaging faces of those members are carried by portions which (before assembly of the pulley) project radially from the cheek members 12 for a distance $d$ greater than half the thickness of the flange 11. Consequently, when the cheek members 12 are bolted to the flange, the members 13 are compressed against each other, thus preventing the rope or cable from separating and damaging the members 13. The fact that the members 13 are bonded to the members 12 prevents the members 13 from slipping in use.

When the members 13 become worn, the members 12 can be unbolted and removed from the flange. Removal and replacement of the members 12 can be readily carried out without dismantling other parts of the system. To replace worn members 13 it is only necessary to transport the members 12 to a suitable location and strip off the worn members 13 and mould on new members 13.

No split moulds are necessary in making the elastomeric ring since it is moulded in two separate parts, and moulding is thereby facilitated. Also, the arrangement results in the elastomeric ring being self-centering and no special machining is necessary to ensure that the ring is centered.

I claim:

1. A pulley means comprising a pair of annular side cheek means which are adapted to be removably secured in facing relationship with each other along opposite radial faces of a rotary hub member, which cheek means each including a respective surface portion along which there is integrally moulded a respective separate layer of an elastomeric material, both of which layers in combination define a circumferential surface along which a pulley cable may lie, said cheek means with their respective integrally moulded layers of material being readily separable from each other and from a hub in which said cheeks are adapted to be rigidly secured.

2. The pulley means of claim 1 including a hub member extending radially between said cheek means, means rigidly but removably securing said cheek means to the opposite radial faces of said hub member, the inner radial periphery of said layers resting against the outer radial periphery of said hub member whereby the latter supports said layers against radially inwardly directed forces.

3. The pulley means of claim 2, said layers abutting each other along a radial interface and being axially compressed between said cheek means, said securing means being adapted to draw said cheek means axially toward each other with said hub being interposed therebetween and thereby defining the minimum axial distance between said cheek means.

4. The pulley means of claim 3, said securing means comprising bolts extending axially through said cheek means and said hub at a radially inward spaced location from said layers of elastomeric material whereby said layers are not traversed by said bolts.

5. The pulley means of claim 1, said layers in combination defining a said circumferential surface which is U-shaped in cross-section.

6. The pulley means of claim 2, wherein said hub member constitutes an integral part of a rotary shaft, said cheek means together with said layers of material being removably mountable on said hub member without disturbing the relationship of said hub member relative to the shaft.

References Cited

UNITED STATES PATENTS

| | | | |
|---|---|---|---|
| 1,632,512 | 6/1927 | Serva | 74—230.7 |
| 1,780,627 | 11/1930 | Muller | 74—230.7 XR |
| 2,217,044 | 10/1940 | Clark | 74—230.7 |

FOREIGN PATENTS 17,854 11/1903 Great Britain.

FRED C. MATTERN, Jr., Primary Examiner

J. A. WONG, Assistant Examiner